United States Patent [19]

Bertram et al.

[11] Patent Number: 6,049,812

[45] Date of Patent: Apr. 11, 2000

[54] BROWSER AND PLURAL ACTIVE URL MANAGER FOR NETWORK COMPUTERS

[75] Inventors: Randal Lee Bertram, Raleigh; Peter James Brittenham, Apex, both of N.C.

[73] Assignee: International Business Machines Corp., Armonk, N.Y.

[21] Appl. No.: 08/751,830

[22] Filed: Nov. 18, 1996

[51] Int. Cl.⁷ .................................................. G06F 13/14
[52] U.S. Cl. ........................... 707/516; 709/203; 707/10; 345/329
[58] Field of Search ..................................... 707/516, 501, 707/513, 514, 104, 10, 203, 208, 209; 395/200.33, 200.48, 200.54, 200.57, 200.34, 200.35; 345/329, 330–335

[56] References Cited

U.S. PATENT DOCUMENTS

| | | | |
|---|---|---|---|
| 5,708,780 | 1/1998 | Levergood et al. | 395/200.12 |
| 5,712,979 | 1/1998 | Graber et al. | 395/200.11 |
| 5,724,514 | 3/1998 | Arias | 395/200.13 |
| 5,761,436 | 6/1998 | Nielsen | 395/200.75 |
| 5,774,670 | 6/1998 | Montulli | 395/200.57 |
| 5,802,299 | 9/1998 | Logan et al. | 395/200.48 |
| 5,855,015 | 12/1998 | Shoham | 707/5 |

OTHER PUBLICATIONS

Dick Oliver, Netscape 2 Unleashed, pp. 37–39, 322, 501, Feb. 1996.

Cameron Crotty, Net Navigator shatters static Web pages, Macworld, pp. 1–3, Dec. 1995.

Steven Baker, Hypertext browsing on the Internet, Unix Review, pp. 1, 4, Dec. 1994.

Brown, M. H. et al, "DeckScape: An Experimental Web Browser," Computer Networks and ISDN Systems, Apr. 1, 1995, vol. 27 (No. 6), pp. 1097–1104.

*Primary Examiner*—Joseph H. Feild
*Assistant Examiner*—Cong-Lac Huynh
*Attorney, Agent, or Firm*—Edward H. Duffield

[57] ABSTRACT

A network browser is provided with working list maintenance and creation facility which contains an indicator for each URL's listing duration level of permanence for controlling how long a URL will be kept or maintained in the working list and also includes an activity duration permanence level indicator for controlling how long the URL will be kept active. This enables the browser to maintain multiple, concurrently active URLs and thereby enable the browser to provide the functional emulation of a desktop working environment to the user.

30 Claims, 10 Drawing Sheets

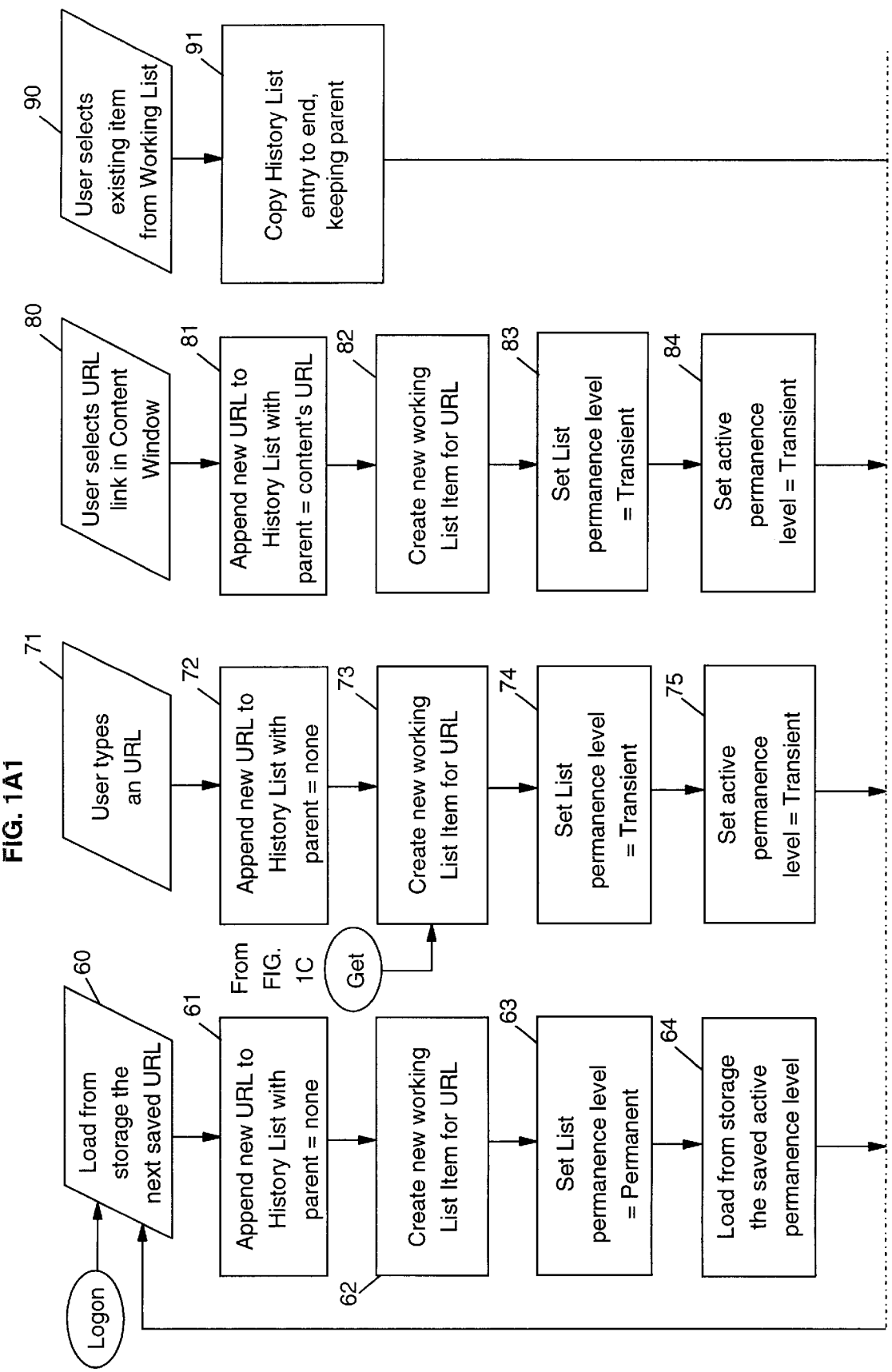

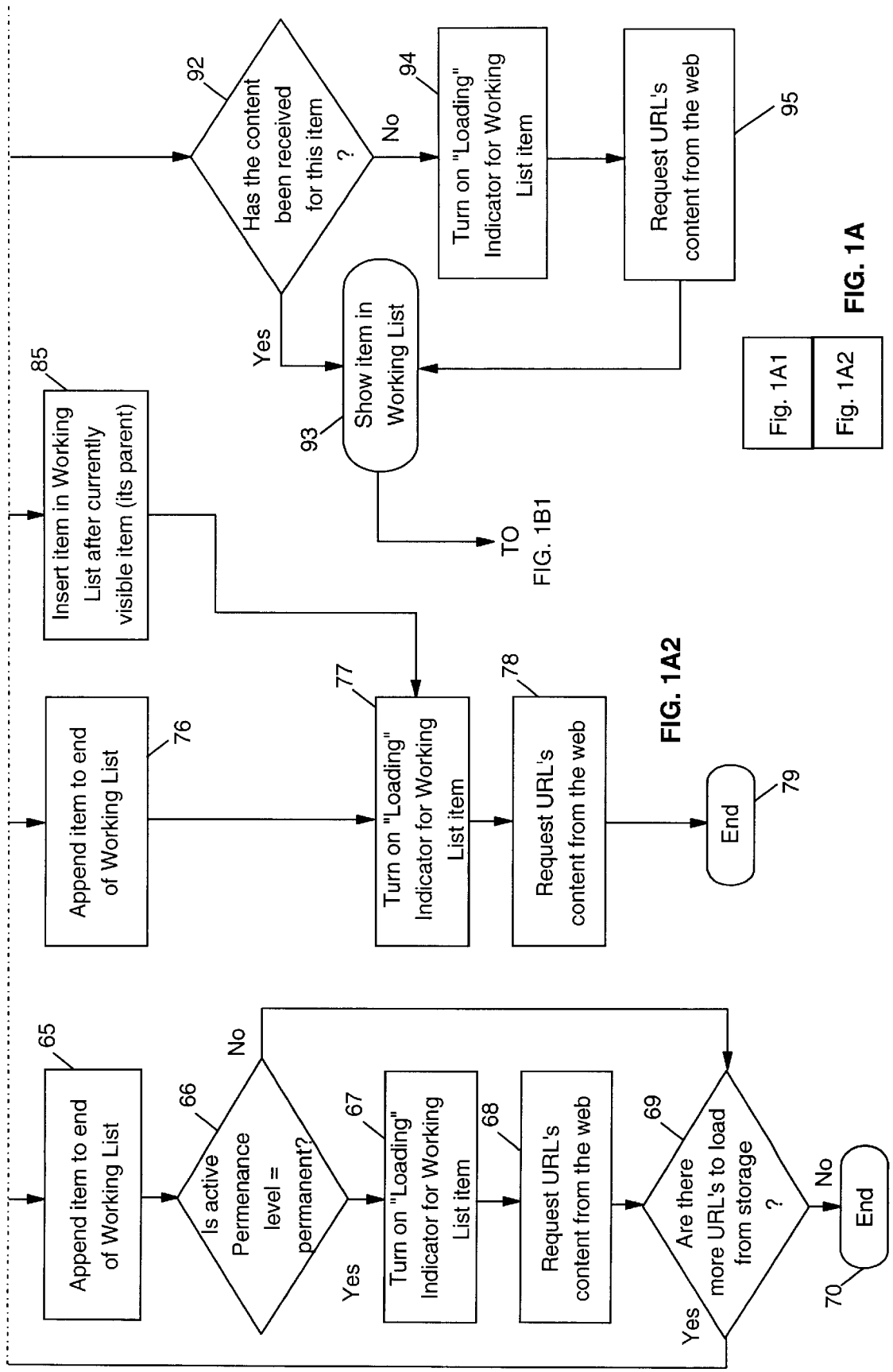

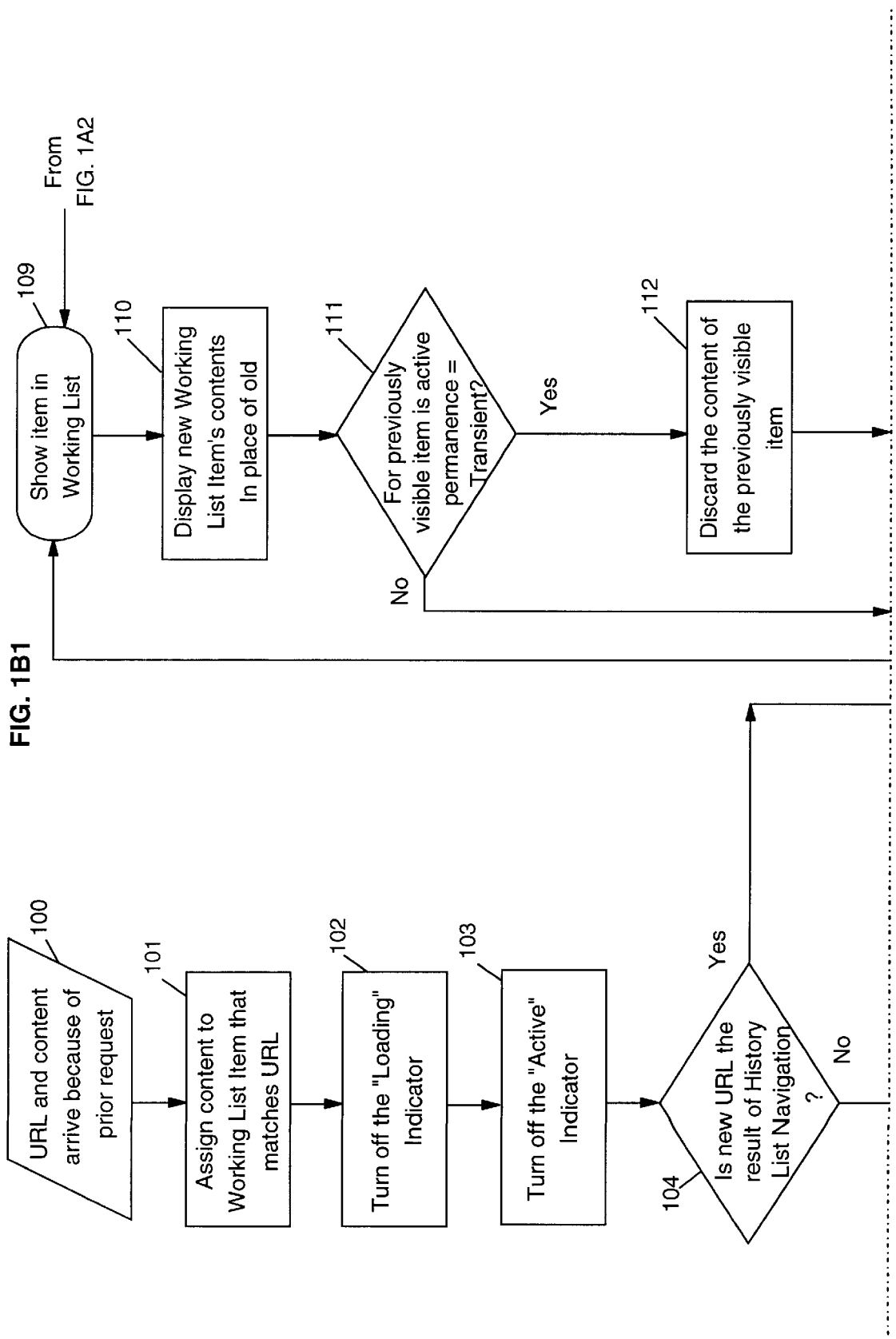

FIG. 1B2

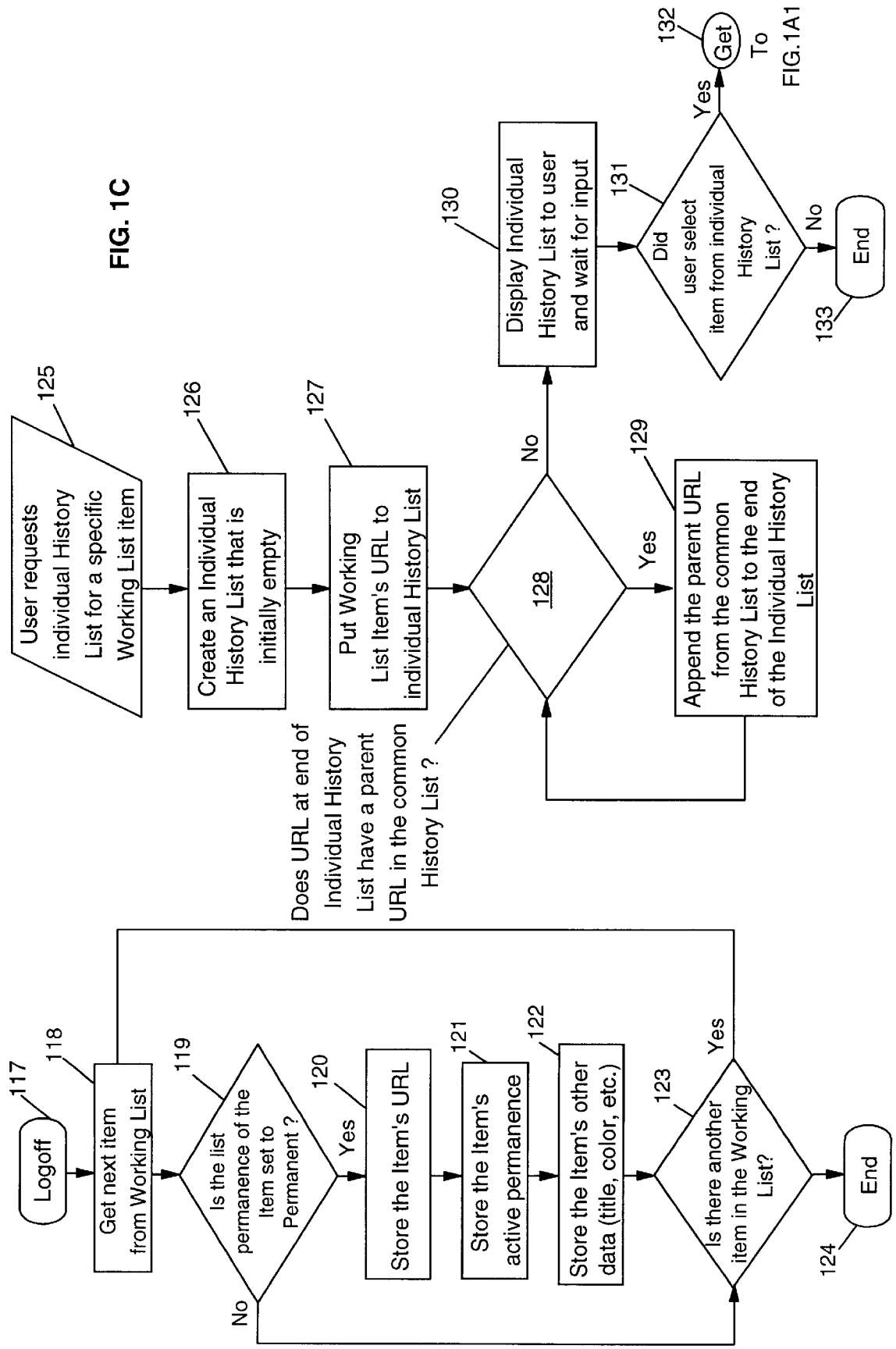

BROWSER AND PLURAL ACTIVE URL MANAGER FOR NETWORK COMPUTERS

FIELD OF THE INVENTION

This invention relates to computer workstations, communication networks and the World Wide Web in general, but more particularly, it relates to an improved browser and user interface capable of managing multiple, concurrently active URLs necessary to support the functioning of a network computer.

BACKGROUND OF THE INVENTION

Prior Art

In the environment of network computers and communications, the Uniform Resource Locator (URL) has become ubiquitous as a means of pointing to or identifying an address location of a specific item or data site accessible in a computer communications network, often called a web. A URL typically points to a HyperText Markup Language (HTML) encoded data item, such as a page of information that can be downloaded from the web and displayed at a user's workstation or network computer. However, a URL might easily point to a text file or a spreadsheet of data, another application program, a library, a file, or a database. In fact, any of the elements that a personal computer user normally accesses from their desktop environment can easily be made available over a communications network from servers or web sites for downloading and use at the user's workstation instead of being stored in memory or on a high density magnetic disk residing at the workstation. There are many advantages to downloading application programs and other computer user facilities periodically to a workstation that are well known in the art, but ease of maintaining consistent release levels and updates across a large body of users is one typical example of such advantages.

A browser is itself an application program or facility that normally resides on a user's workstation and which is invoked when the user decides to access the communications network known as the web. A prior art browser program typically sends and receives URL requests and responses to and from the communications network which forms the web. The browser also processes each type of data which is presented to it, and forwards and receives data to and from the web. A typical example is an HTML renderer function in the browser equipped computer system that displays an HTML page of data. A spreadsheet program in a typical user's computer may manipulate a spreadsheet. Interaction between the browser application and the spreadsheet application is facilitated at a user's computer to allow downloaded data, for example, to be forwarded by the browser internally to the spreadsheet application. This is done under the facilities of the user's computer operating system resident at the workstation. However, these prior art systems do not allow for multiple, concurrently active URLs, either in the browser application itself or in the operating system of the user's computer workstation. In the prior art, as a browser application is moved from URL to another URL at the user's direction, only one URL at a time is active. By active, we mean that the URL data content is loaded in memory at the user's computer and is ready for display and/or use. When a user selects another URL or selects a hyperlink from a displayed URL content, such as an HTML page, the browser application will access a new URL indicated by the hyperlink or the user's new selection. When this occurs, the previously active URL may be made inactive and stored in a history list or deleted entirely.

As stated, the URL contents are considered active when they are currently being processed by the user's computer processor, while its contents are being presented by the browser application. An active URL might constitute an HTML page of data being displayed by the browser or a spreadsheet that a user might be currently editing using a spreadsheet application program to edit data content of a URL accessed over the web. In general, the prior art browsers make a URL active only when the user types the URL manually or selects a URL link in a hypertext page environment, or selects a URL from a history list or a hot list, as these are known.

In the prior art, the browser application program typically only has a single URL active at a given time. There are two possible exceptions in that the user may start multiple application instances of the browser application and each application instance can have its own active URL, or the user may make active an HTML page pointed to by a given URL, and that page may have associated with it a frame which is a management technique supported for HTML pages that allows multiple active URLs to be present within a given HTML page. Inside an HTML page having such a frame, the user can move from one URL to another simply by clicking on links, but cannot change the number of URLs or frames or their arrangement on a page. Since each frame must have an active URL, the exact number and arrangement of active URLs are determined by the original author of the HTML page of data and does not affect the user's operating system or environment in a way which would allow universal arbitrary activation of any other multiple URLs by the user.

In addition, most prior art browsers maintain a history list of URLs that have been accessed and made active over some period of time. Depending upon the browser application itself, the history list may keep a record of URLs that have been previously active over one or many sessions or only over a short period of time, such as since logon. The history list is a tool used by the prior art URL browsers for allowing a user to navigate backwards and forwards to visit a URL that has previously been seen or to return to one and then go forward. Such a history list is a simple one dimensional array since the prior art browsers can have only a single URL active at a given time. By traversing the history list of URLs previously activated, the user can return to any previously active URLs easily, at least to the extent that the history list maintains them. History lists may be limited in the number of URLs that are kept in the list simply by memory constraints, or may be limited in the duration of time for which previously active URLs are kept in the list.

Most available browsers are known in the prior art, such as the IBM Corporation's WebExplorer(™), or the Netscape Corporation's well known browser called Navigator(™). Such browsers typically have history lists of URLs that have been active, and also a user reference list which a user constructs, which is permanently kept, called a hot list or bookmark list. Such lists are commonly supported by browsers, so that when a user realizes that a currently active URL content may be useful to him or her at some time in the future, a user can set a bookmark or enter the URL into the hot list while it is active so that the URL may quickly be reaccessed by simply selecting it from the hot list or bookmark list in the future.

All of these functions of the prior art browsers are supported by the computer workstation or personal computer operating system, such as the IBM OS/2(™) or the Microsoft Windows(™). These operating systems, and others of their type, typically feature a desktop metaphor for displaying an arrangement of icons, programs, functions and data objects and other facilities, such as printers or browsers, which may be available to the user for selection and invocation and execution by their operating system. In such environments, a desktop facility, such as an application program, can be launched or is invoked simply by selecting a data object of the type that the application program processes. The usual operating systems that present the desktop as a metaphor for the facilities available to the user through the operating system can launch and manage multiple active application programs. However, the desktop operating system does not provide the hyperlink personality that is characteristic of browsers, since the desktop operating system does not follow a user specified trail from one application program or facility to the next the way that a browser follows a trail of hyperlinks from one URL to the next, since the desktop manages multiple application programs or data objects independently, and not in a fashion that links them together in a sequence.

As the Internet or World Wide Web becomes more powerful and its use grows more prevalent, increasing numbers of computer users find that application programs available on the Internet enable them to do all of their usual and customary work that would have been done by application programs resident on their own computer system workstation. Many different application programs, such as word-processors or spreadsheets are now available over the Internet, in addition to the usual HTML content. As a result, many Internet users no longer need to have both the hardware and software of a fully outfitted personal computer at their individual workstation. The result is a so-called Network Computer, or NC, a computer whose function is to access a network and from which all further functionality is provided by the network. An NC may not have the local hard drive or local permanent storage typically present in a personal computer or individual workstation because storage occurs at a different physical location, such as a server, available over the web and shared by many other users. A characteristic of a Network Computer is that users can log on at any NC in the network and access their own data, whereas PC users, or workstation users, typically must use their own PCs or workstations to access their own data. The popularity of the network computer architecture is partially due to the reduced cost of hardware, but also due to the reduced cost of support. A system administrator can make changes to a user's software configuration without having to visit the user's office or to analyze the individual user's hardware configuration, which eliminates considerable expense and confusion. In addition, updating of application programs used by a group of users in common, such as in a corporate environment, can be simultaneously performed simply by changing the content at the server, which all share.

As new computer system users begin to regard the Internet or World Wide Web as their primary operating environment, there is a need for a single user interface, which is suitable for two different types of user activities. First, the ability to surf or follow a sequential series of links or hyperlinks is necessary for perusing the extensive content available on the web. Secondly, managing of multiple concurrently active applications or data objects (accessed from URLs) is required to take place in a way similar in effect to that provided by the operating system of personal computers or workstations. Currently, personal computers and workstation handle the two different types of activity with two different user interfaces. The desktop interface manages applications, of which the browser is simply one of the applications, and the browser interface supports and manages the surfing capability for accessing various URLs via in the web.

The typical browser today supports the surfing navigation, and also provides powerful search algorithms developed for finding or locating specific topics and contents of URLS, wherever they may reside in the World Wide Web. In combination, the net or World Wide Web, in conjunction with a browser search engine, will now provide to the user the overall data retrieval mechanism to operate much as a host supported workstation of the past. In the World Wide Web, documents or sites, are typically written in a definition language, referred to as HyperText Markup Language (HTML). Until very recently, the World Wide Web included sites with almost exclusively two-dimensional graphics and text. This was, in part, due to limitations inherent in the original HTML language capability. The Internet itself is a large number of computers, which are linked together via a communications network, and which contains a large number of sites, each site having its own unique URL to identify the computer location on the Internet at which the site resides. A typical user accesses a site on the Internet from the personal computer or workstation via a communications adapter connected to a telephone line, and from thence to an Internet service provider which links the user to the Internet or World Wide Web. The user needs web browser software, such as the Netscape Corporation's Navigator or IBM's Web Explorer, as noted above. The browser is run as an application program on his or her workstation or personal computer to enable the user to view the World Wide Web content on the Internet.

OBJECT OF THE INVENTION

In light of the foregoing environmental difficulties present in the known prior art Internet browser systems, it is an object of this invention to provide an improved browser method and apparatus which is capable of loading multiple URLs and keeping them concurrently active.

BRIEF SUMMARY OF THE INVENTION

The invention will further be described and illustrated with respect to a preferred embodiment in which a single instance of improved browser, in accordance with the invention, is enabled to maintain multiple active URLs concurrently. This is facilitated by having the browser construct a working list within the browser's available memory space that contains URLs with which the user is currently working and in which plurality of URLs may be currently active. The working list may include a visual cue to indicate the activity status of each URL to the user. Each URL in the working list has assigned a listing duration level of permanence, which controls how long the URL will be kept or maintained present in the working list, as well as an indication of the circumstances under which it will be removed from the list. This level of listing duration permanence is visible to, and may be modified by, the system user. In addition, each URL on the working list has an assigned level of activity duration permanence for controlling how long the URL will be kept active, and of the circumstances under which it will be deactivated. This level also is visible to, and modifiable by, the user. The browser is configured to automatically add and remove URLs that are temporary or transient in their existence, to or from the working list. In addition, the position where the browser inserts a URL into the working list is determined in a fashion that indicates how the URL came to be added. The browser also maintains a history list for all URLs that have been active, so that a user can use navigation commands to retrace the path of links that have previously taken, i.e. to reaccess previous URLs that have been accessed. Also, the invention is devised so that, at a user's request, the browser can create a history list of specific URLs in a path that is personalized for each active URL. With this capability, a user can retrace the path of links created for an individually active URL without regard to the other paths of links for other active URLS. Thus, any URL that has been loaded, i.e. made active, that has an activity duration permanence level higher than transient, is kept loaded and active until it is removed by user choice or occurrence of some stated condition, such as logoff.

BRIEF DESCRIPTION OF THE DRAWINGS

The invention will now be described in detail with reference to a preferred embodiment, which is illustrated in the drawings, in which.

DETAILED DESCRIPTION OF THE PREFERRED EMBODIMENT

Figure 2:
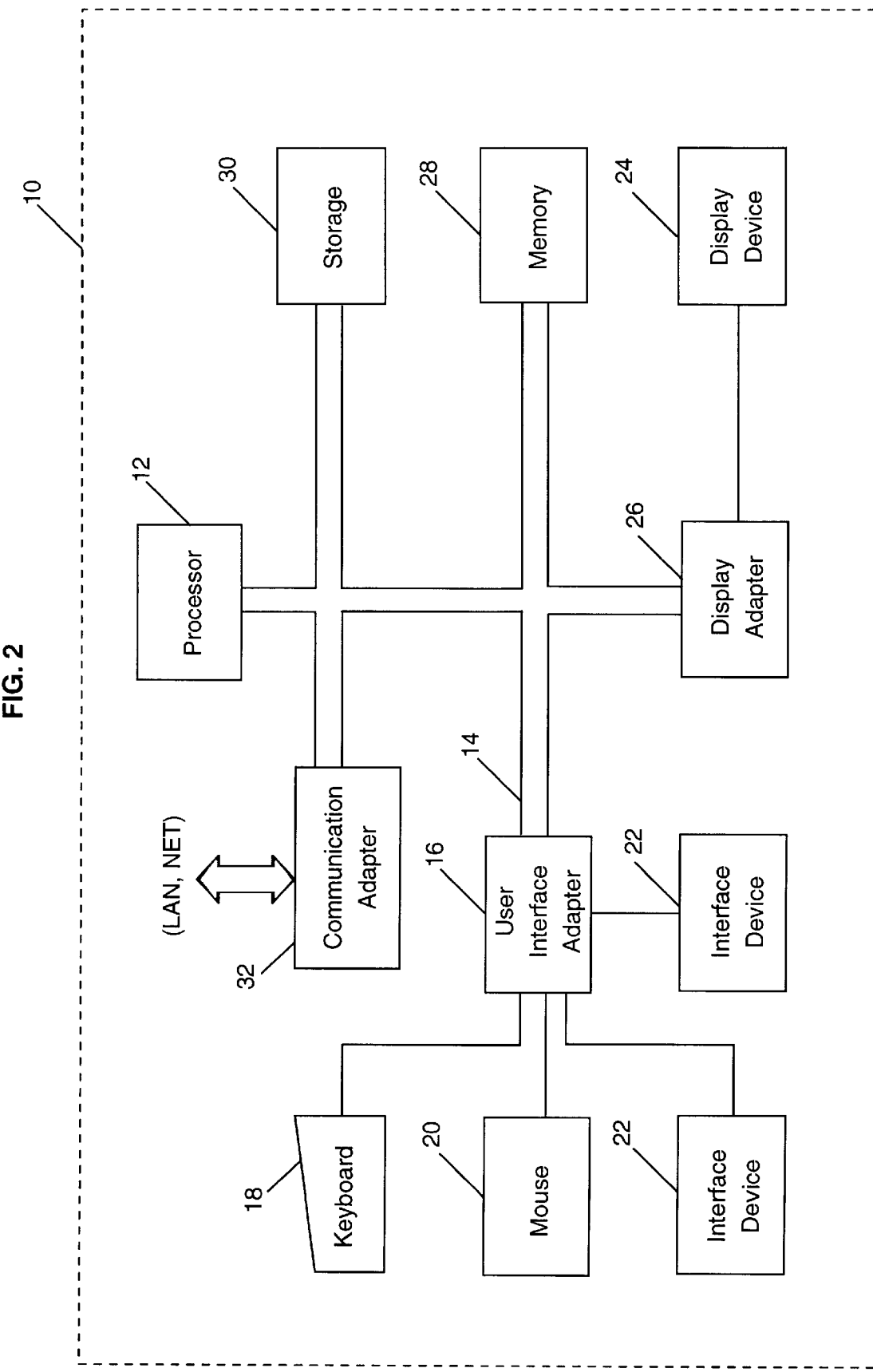
FIG. 2 schematically illustrates the primary components of a personal computer, workstation or network computer in which the present invention may be practiced.

FIG. 2 illustrates a representative workstation or personal computer hardware environment in which the present invention may be practiced. As shown in FIG. 2, such an environment comprises a representative single user workstation 10, such as a personal computer, workstation, or network computer, which includes memory and related peripheral devices. The workstation 10 may include a microprocessor 12 and a bus 14, which is employed to connect and enable communication between the microprocessor 12 and the memory and other components of the workstation 10 in accordance with well known techniques. A workstation, network computer or personal computer 10 typically will include a user interface adapter 16 for connecting the microprocessor 12 via bus 14 to one or more of the interface devices. Such devices are well-known and include a keyboard 18, a mouse or other selection cursor device 20, and/or other interface devices 22, which could be any other kind, such as a touch sensitive screen, digitized entry pad, voice recognition apparatus and the like. Bus 14 also connects a display device 24, such as an LCD screen or monitor, to the microprocessor 12 via a display adapter 26. Bus 14 also connects microprocessor 12 to memory 28 and to permanent storage 30, which can include a hard drive, tape, disk, etc.

Workstation 10 communicates via a communications adapter 32 to a communications network, and thence to other computers or networks of computers. Workstation 10 may be associated with such other computers in a local area network (LAN) or wide are network (WAN), or the workstation 10 can be a client in a client/server arrangement with some other computer in the network. Similarly, as has been mentioned above, the workstation 10 can be a network computer, which might not require the hard drive or permanent storage or full operating system that is conventionally found in most computer workstations and personal computers.

Figure 3:
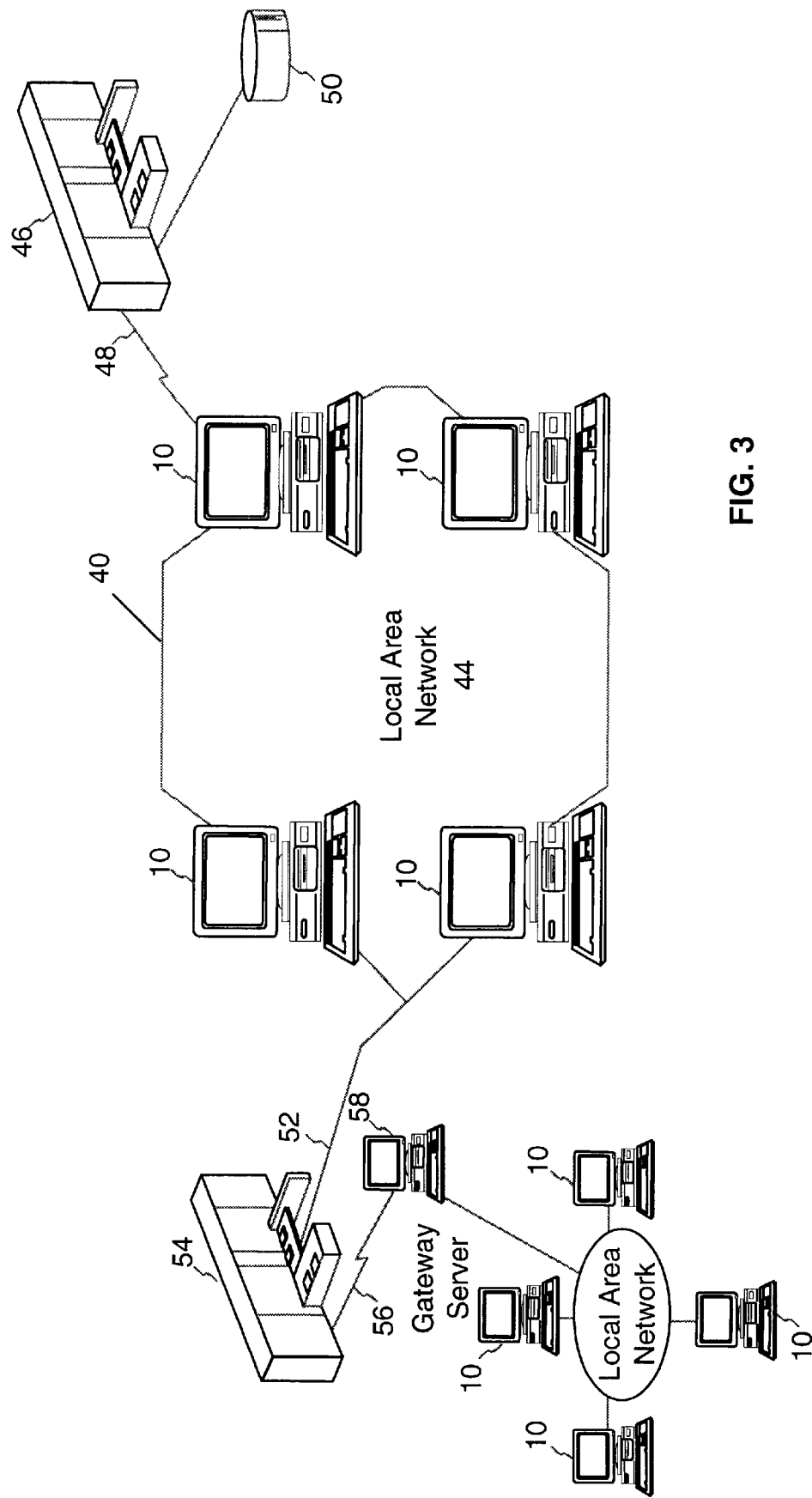
FIG. 3 schematically illustrates a data communications and computer network of the sort in which the invention may be practiced.

FIG. 3 illustrates a data processing network 40. The data processing network 40 includes a plurality of individual networks including the LANs 42 and 44, each of which includes a plurality of individual workstations 10. Alternatively, as will be appreciated by those of skill in the art, an individual LAN 42 or 44 may comprise a number of intelligent workstations or network computers coupled to a host processor. Multiple mainframe computers such as computer 46 may be connected to a LAN by means of communication links 48 as shown in FIG. 3. The mainframe computer 46 may be implemented any of a variety of architectures well known in the art. A mainframe computer may also be coupled to a storage device 50 which may serve as a remote central storage for a LAN 44 and the LAN may be coupled to a communications link 52 through some subsystem control such as controller 54 and communications link 56 to a gateway server 58 for eventual access to other local area networks and workstations. The gateway server 58 is preferably an individual computer or intelligent workstation and serves to link LAN 42 in FIG. 3 to LAN 44. Those skilled in the art will readily appreciate that the mainframe computer 46 may be located at a great geographic distance from the LAN 44 which in turn may be located a substantial distance from the LAN 42. A mainframe computer 46 might be located in New York, for example, while the LAN 44 might be located in Texas and LAN 42 might be located in North Carolina.

The present invention is typically embodied as software programming code which may be stored in permanent storage of some type such as the permanent storage 30 of the workstation 10. In a client server environment, however, such software programming code could be stored with the storage associated with a server such as storage 50 associated with computer 46 operating as a server as shown in FIG. 3. The software programming code in which the invention is embodied can itself be implemented on any of a variety of known media for use with a data processing system such as a floppy diskette, cassette tape, hard drive or CD ROM. The code may be distributed on such media or distributed to users from the memory or storage of one computer system over a communications network of any given type to other computer systems for use by users of such systems. The techniques and methods of embodying software program code on physical media and/or for distributing or embodying the code locally via networks are well known and will not be further discussed herein.

In accordance with the present invention, a network computer can use an improved browser as a desktop operating environment. As with a conventional prior art browser, the improved browser must be capable of moving from one URL to another, of maintaining a history list of URLs that have been accessed, and of maintaining a list of URLs that have been tagged for later recall by placing of bookmarks or addition to a hot list. Like a desktop operating environment, the improved browser must keep multiple entities active at a given time, i.e. these entities must be loaded into memory for execution. However, for the system to be easily useable, the improved browser must make use of a new history list and a new working list in order to easily support the requirement of multiple, concurrently active URLs.

Figure 4:
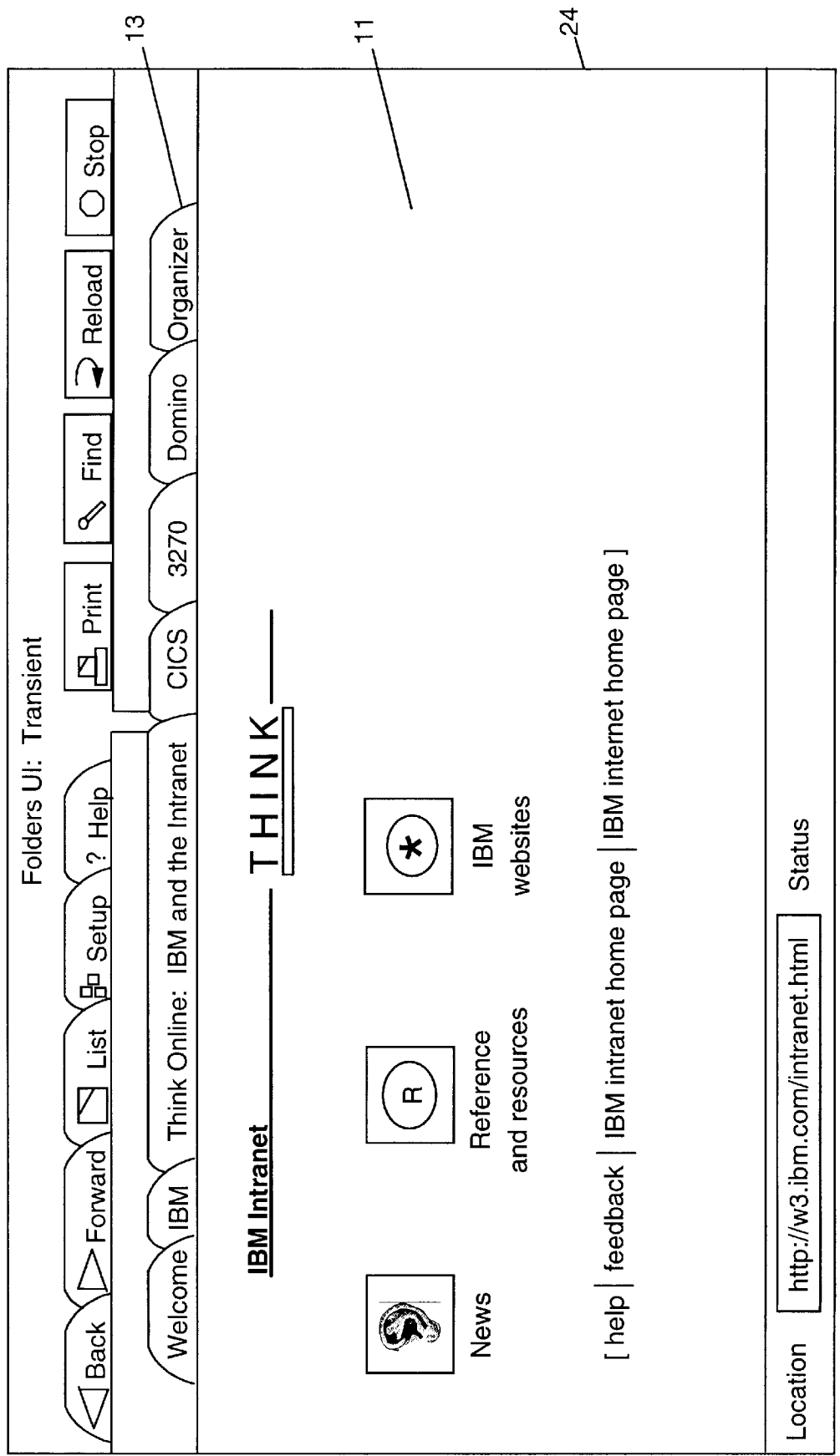
FIG. 4 illustrates an embodiment of the invention in which the activity duration permanence level states and contents of a working list may be viewed in one portion of a display screen, while the currently active URL content is being displayed in another portion thereof.
Figure 5:
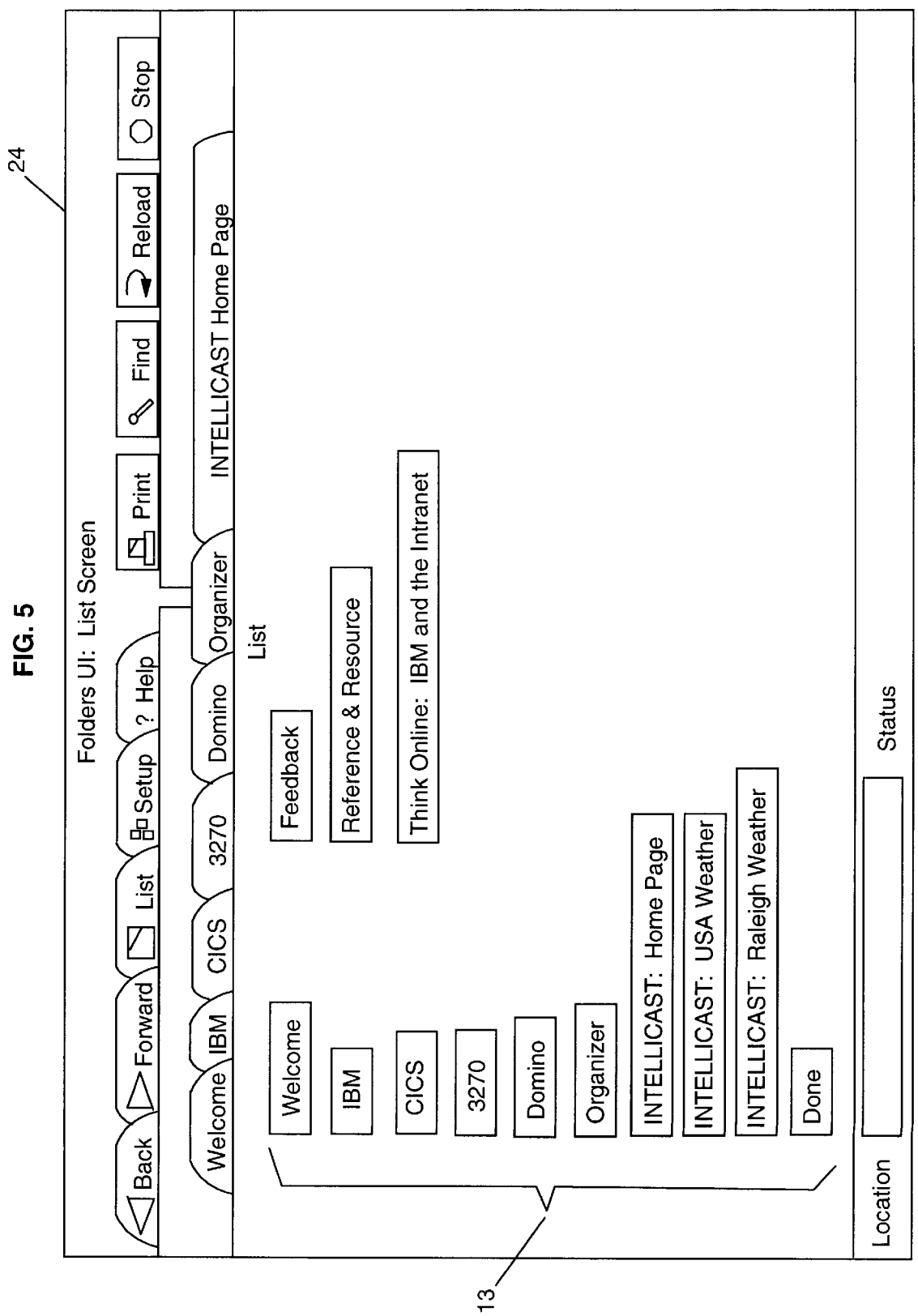
FIG. 5 illustrates an alternative view of the invention in which the working list itself is displayed in the display screen area in place of the URL content.

To manage multiple, concurrently active URLS, the invention provides two distinct types of information on a display screen. First, a new, selectable list of URLs, called a working list, has been implemented. In the preferred embodiment, the working list of URLs may be displayed as a list of URLs, as menu lists, as a series of overlapped folders with marked tabs, by tables or nemonic diagrams or the like. In addition, a contents display window, which renders the content of the URLs as they are selected from the working list, should be provided. There may be more than one content window. In the preferred embodiment such as depicted in FIG. 4, a single content window 11 shows the content of a typical URL from the Internet while the members of the working list are depicted as series of overlapped, marked tabs 13 in an upper portion of the overall display screen of a display device 24. URLs, whose titles are shown on the marked tabs 13 in FIG. 4, may be active without being currently displayed with the content window 11. As is typical with user interfaces, the space allocation between the working list display area as shown in FIG. 4 and the content window may be varied by the user and other views may be chosen. The preferred embodiment offers a list view in which the working list fills the entire screen as shown in FIG. 5, so that the content window is completely obliterated. A list-only view as shown in FIG. 5 is useful for navigation purposes and for list management, although all of the navigation and list management functions can easily be performed in the split view such as shown in FIG. 4. A content only view is also possible as will be apparent to those of skill in the art.

Each item from a working list 13 as shown in both FIGS. 4 and 5 has several attributes or parameters that define the item's appearance and behavior. For purposes of the present invention, several new attributes have been defined for each item in the working list. The chief components of the item in the working list are its URL which is an identifier that points to the site or location having content on the Web which is to be represented by this working list entry item. The URL is the main identifier, but not the only identifier for an item in the working list. Secondly, each item in the working list has a content which may be an HTML page of data, a text document, a spread sheet or the like. The content is retrieved from the Web and displayed in the content window 11 in FIG. 4 for example. While the system is waiting for the requested URL content to arrive from the Net, an item's content is blank. When the URL content arrives from the Web, it is assigned to the working list item content. As will be apparent to those of skill in the art, some types of content support hyperlinks. For example, an HTML page can contain a defined hyperlink to another URL. If the user should select a link in the content window display from a given URL's content, then a new URL content will be requested as will be described in greater detail with reference to FIGS. 1A and 1B.

Figure 6:
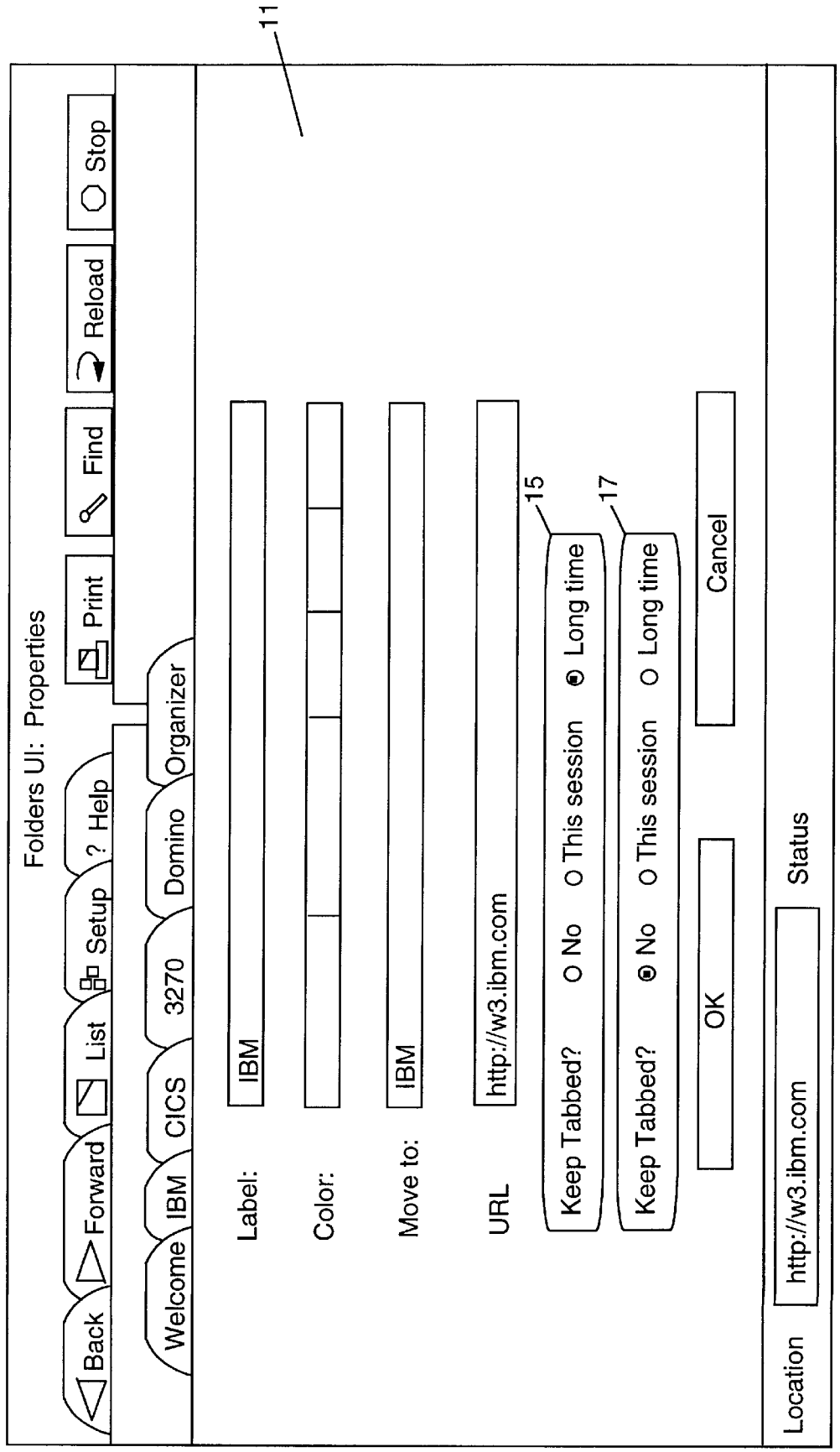
FIG. 6 illustrates a user selection and control interface screen for setting and maintaining the list duration permanence level and the activity duration permanence level under user control.

A third element or parameter for an item in the working list is the title of the URL. An HTML title is used as the default for HTML page content being displayed. Other types of content may not have readable titles, but the user can specify a title as desired. FIG. 6 illustrates a user selection panel with an area for entering a label or title of the user's choice for a given working list item. Visibility is a fourth parameter or element included in an item in the working list in accordance with the invention. The content window 11 of FIGS. 4 and 5 is capable of displaying at least one URL's content from URLs in the working list. If any URL in the working list currently has its content displayed, it is said to be visible and to be visible its URL must, of course, be active. A visible URL should be highlighted in some way. In the preferred embodiment, since only a single visible URL at a time has been visually represented, the distinction is shown as a folder tab that is placed in front of the others. In FIG. 4, the "Think Online: IBM and the Intranet" is the the foremost folder and its content is displayed within window 11.

List permanence or listed item duration permanence is a new element provided by the present invention. A fundamental concept which forms a part of the invention is that URLs in the working list will have multiple levels of list permanence duration and these levels are selectable by the user. The level of list permanence duration controls how long a given URL item will be kept in the working list. Three levels of permanence have been defined in the preferred embodiment. The levels of working listing duration permanence in a preferred embodiment are, first, "Transient". A Transient item is automatically added to the working list when it has been called for and it is removed from the working list when it is no longer active. Typically, this will occur when an HTML page presents a hyperlink and the user selects a link. Then one transient URL in the working list will be replaced by another transient URL item. In the preferred embodiment a particular color or highlighting may be reserved for showing the list items that represent transient URL working list permanence levels. A second possible listing permanence duration level for the working list is "Session" permanence. A session permanent duration level item in the working list will be kept in the working list until the user logs off of his system. The next time that the same user logs on, the session permanence listing duration URL item will no longer be listed. This has the function of acting like a temporary bookmark or temporary hot list item. The third and final level of working list item duration permanence is "Permanent". A permanent item is kept in the working list indefinitely, including between sessions and acts much as a lasting bookmark. The invention can be implemented with only two levels of permanence if session and permanent levels are combined but additional levels could also be defined for unique circumstances.

As shown in FIG. 6, the user is provided with means for setting the level of listing duration permanence for a particular item in the working list. In FIG. 6, the box labelled shows where the user may make a selection for a given URL entry to set its level of working list duration permance with the selections being "no" or "none" for transient level, "session" for session level and "long time" for Permanent level of duration in the list.

In operation of the browser in accordance with the invention, a user will pass through transient URLs continuously. A transient URL is created by clicking on a link in the content window 11 or by typing the URL's identifier in an input field on the screen as is common in th prior art. However, if the user decides that a particular URL content may be useful again in the future, the user can change the URL's working list permanence level to "session" or "permanent" as desired.

A fifth item or parameter for an entry in the URL working list is also new entirely and represents the activity duration permanence level. This parameter enables the browser to decide which URLs to keep loaded and how long to keep them loaded and active. The three levels of permanence for working list listing duration are also available to the user for setting a URL item's activity duration level in the working list. The "transient" level indicates the URL will be activated when its content is delivered and becomes visible on the display and deactivated when the content is no longer visible. "Session" level of activity duration permanence indicates the URL will be activated when its content becomes visible and it will be kept active throughout the session until logoff. A "permanent" level of activity duration permanence means that the URL will be activated when each session starts and will be maintained active throughout each session. In FIG. 6, the box labelled 17 provides the area where the levels of activity duration permanence may be selected.

Since a given URL cannot be active if it is not already listed in the working list, it follows that an important rule is that the active permanence duration level assigned cannot exceed the listing permanence duration level. The user is prevented from selecting an active permanence level of duration that is higher than the listed permanence level. While listing permanence is analogous to bookmarks of the past, active permanence levels have no such counterpart in conventional prior art browsers. The active duration permanence level is closely related to listing permanence duration level, however, for the reasons listed above. Consequently, as shown in FIG. 6, a preferred embodiment of the invention provides a user control screen for the various duration permanence factors and shows the three levels of listing duration permanence and corresponding three levels of activity duration permanence beside one another in boxes 15 and 17 as described above.

A final item or parameter in the working list is the current activity state of a URL. The working list contains an indicator for each URL showing whether that URL is currently not loading or active, is in the act of loading, or is already active. In the preferred embodiment, the title of the URL is italicized by changing the font in the list tabs to show that a given URL is active, but any other attribute such as color, font size or style, illumination intensity, brightness, etc. could be used instead to indicate that a URL is active. In the preferred embodiment, a small stop sign indicator that the item is loading, and clicking on the stop sign halts loading. In accordance with the invention, the currently active state is shown for each URL in the active list. By contrast, a conventional browser shows only one URL active at a given time so there is no need for multiple indicators to show the activity state for more than one URL, nor for any multiple controls to stop loading, etc.

Another item of significance is the URL entry item's physical position in the working list. A URL item's initial position in the working list would be after its parent URL, which is determined by consulting a history list, but if the URL has no parent or the parent is no longer present in the working list, then the URL's entry is placed at the end of the list. This permits a user to see related URLs grouped together for convenience. Also, if a URL's parent URL is transient, it is important to position the new URL after its parent, because when the parent disappears and the new URL is added it will be equivalent to replacing the URL's parent in the working list with the new URL contents and parameters. A user can also change the position of entry items in the working list by utilizing drag and drop controls for example.

A unique history list is also created and maintained by the preferred embodiment of the invention. As is well known, most conventional browsers maintain a history list of all URLs that have been recently active so that the user can traverse the history list to return to a previously visited content. However, the browser in the preferred embodiment of the present invention must keep a record of the parent of each URL that has been active as well as the identifier for each URL. Hence, an item in the history list is shown with two properties. The URL identifier itself is placed in the history list once it has been requested and secondly, the URL's parent, if any, will also be kept in the list. For example, if a user selects a hyperlink in a first URL content and the selected hyperlink points to a second URL, the first URL is said to be the second URL's parent. The browser list-keeping function only needs to track parent relationships for the links that the user has actually selected, so it is not necessary to analyze all possible child links that could have been taken for each parent. It is also possible that an item in the history list may be a URL that has no parent URL. For instance, if a user manually enters a URL designator, the URL's parent will not be known. The only URLs with known parents are the ones that are selected from a given URL's content display window because the current URL itself will be recorded in the history list as the new URL's parent for any link selected from that content window.

Figure 1B:
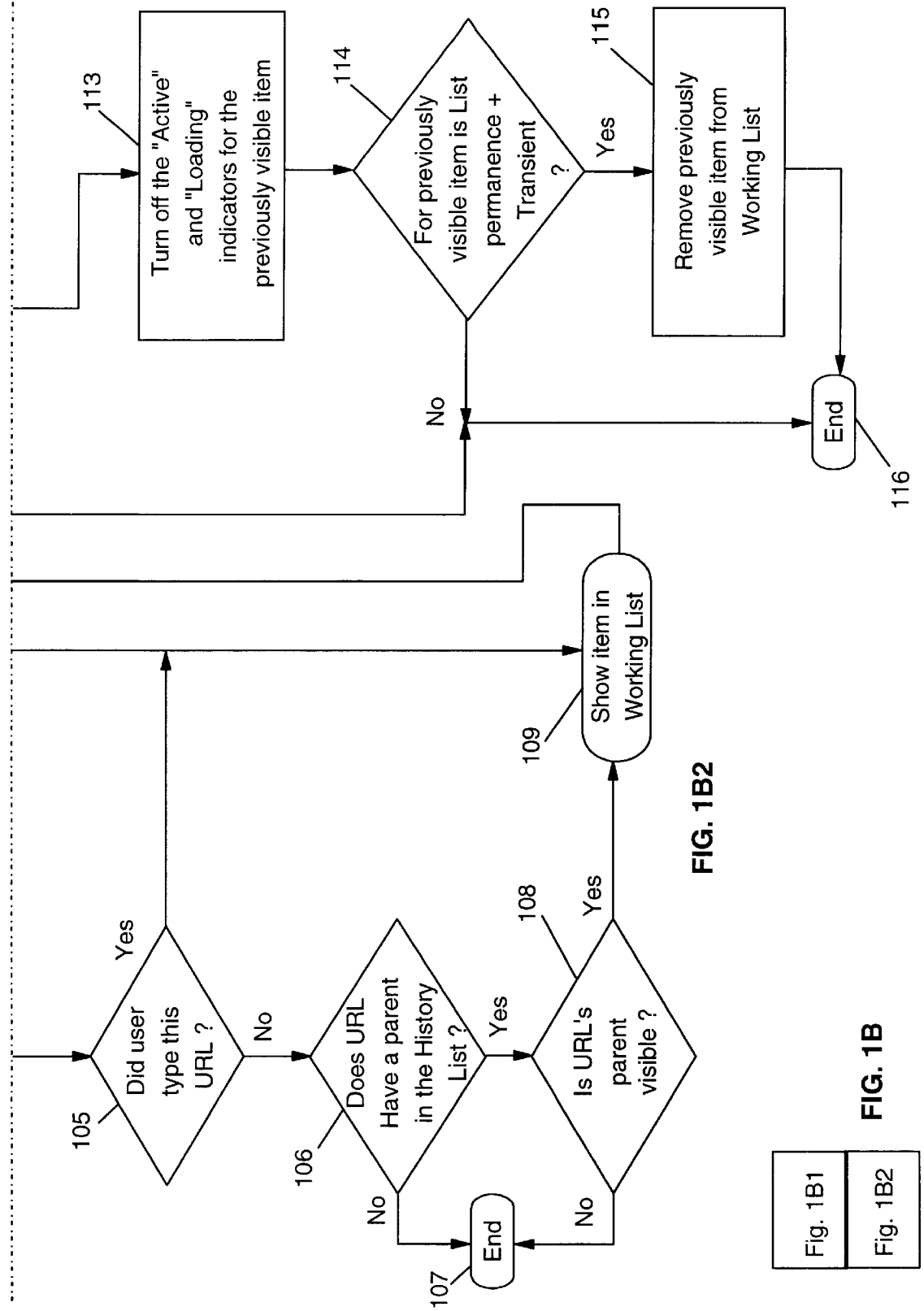
FIG. 1, consisting of FIGS. 1A, which consists of 1-A1 and 1-A2; 1B, which consists of 1-B1 and 1-B2; and 1-C, taken together, schematically illustrate the procedural steps in creating and maintaining and managing a history list of URLs, and of creating and maintaining and managing the working list for URLs, in accordance with the invention.

The history list facilitates the implementation of the backward and forward navigation function standard in the prior art. However, a browser using the present invention can use the accumulated data of URLs and parents to construct an individual history list for any URL that is active. This allows a user to backtrack through a series of hyperlinks that were followed to arrive at a given active URL without regard to the links that lead to other active URLS. The invention as embodied which will be described further with relation to FIGS. 1A, 1B and 1C provides a control for each active URL which creates, displays, maintains, manages and traverses the history list for that URL.

Turning to FIG. 1A, a detailed schematic flowchart of the steps performed in carrying out the function of the preferred embodiment will be described further.

In FIG. 1A at box 60, logon occurs at the user's computer and the browser loads from storage the first saved URL and appends its URL identifier to a history list with its parent identification set to none as shown in box 61. In box 62, the process creates a new working list item for the URL retrieved from storage. In box 63, the working list listing permanence duration level is set to "permanent" because this URL must be a permanent one since it was retrieved from storage. In box 64 the system loads from storage the URL's associated activity permanence duration level and appends the URL item with its parameters to the end of the working list in box 65. In box 66, a question is asked as to whether the item's activity duration permanence level is permanent and if the answer is yes, the URL is loaded into memory and a loading indicator is turned on in the working list item parameters in box 67. In box 68 this active URL has its content requested from the Web and in box 69 a check is made as to whether there are more listed URLs to load from storage. If the answer is yes, the routine branches back to box 60, and if it is no, it ends in box 70.

Returning briefly to box 66, if the URL's activity duration permanence level is not set to permanent, the system branches to block 69 immediately and proceeds as described earlier from there. This is part of the process for setting up the history list and the working list for URLs that have been saved in storage for retrieval and initiation at next logon. Items of this type might be identified as permanently listed items such as from a hot list or items for which the user has set a permanent listing duration level. The item's activity permanence duration level might or might not be set to permanent; if it is "session only" or "transient", the item URL is loaded in the working list history list but it is not made active by loading the URL and contents into memory for execution.

A second case is illustrated beginning at block 71 in FIG. 1A where the user types in a requested URL after a system has been logged on. In block 72 the new URL is appended to the history list with its parent identifier set to none. In block 73 a new working list item for the URL is created and in box 74 the listing permanence level is set automatically to transient level. In block 75 the activity duration permanence level is automatically set to transient and in block 76 the item's identifiers are added, with the URL, to the end of the working list since no parent is known. In block 77, system turns on the loading indicator in the working list item parameters and in block 78 the URL's content is requested from the Web with the process ending at block 79 from which the system will await receipt of the requested URL content.

In block 80 of FIG. 1A, a user might select a hypertext URL identifier from a hypertext link in a previous URL's displayed content window which must be accounted for in the listing routines. Block 81 appends the newly identified URL to the history list with the parent set equal to the content screen display's URL identifier. In box 82 a new working list item is created for the linked-to URL, and in box 83 the URL's permanence level for listing is set automatically to transient. In block 84 the new URL's activity duration permanence level is automatically set to transient, and in block 85 the new URL item is inserted into the working list immediately following placement in the list where its currently visible item, the parent, has been listed. The process then branches to block 77 and proceeds as described earlier.

A final possibility is that the user selects a URL from an existing item in the working list itself. This is shown in block 90. In block 91, the history list item is copied to end, keeping its parent in the list. In block 92 the question is asked as to whether the URL's content has been received already. If the answer is yes, the item is added in the working list as shown in block 93 and the process branches to FIG. 1B. If the answer is no in block 92, in block 94 the loading indicator is turned on in the working list item parameter. In block 95, the URL's content is requested from the Web, which then passes operation to showing the item in the working list in block 93 which then branches to FIG. 1B to await receipt of the URL content.

Turning to FIG. 1B, the working list maintenance routines of the preferred embodiment of the invention are illustrated. In block 100, URL content is received from the Web because of a prior pending request and in box 101 the contents are assigned to the working list item that has the matching URL identifier to that received. In block 102 the loading indicator in the working list is turned off and the active indicator is turned on in box 103. In box 104 a question is asked as to whether the new URL resulted from navigation forward or backward in the history list. If the answer is yes, the item is shown in the working list in box 109 and the new working list URL item's content is displayed in place of the old URL's content in box 110. In box 111 a question is asked as to whether the previously visible content item URL had an active duration permanence of transient. If the answer is yes, the system discards the contents of the previously visible item in box 112, turns off the active and/or loading indicators for the previously visible item in box 113 and in box 114 asks whether the previously visible item's listing permanence duration level was transient. If the answer is yes, block 115 removes the previously visible item from the working list and ends at block 116. If the answer is no, the previously visible item's identity is left in the working list and the process ends in block 116. Similarly, returning to block 111, if the previously visible item's activity duration permanence level was not transient, i.e. was higher than transient, the process ends in block 116 with the item being left in the list. Returning to block 104, if the new URL was the not the result of a history list navigation, block 105 is entered and the question is asked whether the user entered the URL. If the answer is yes, operation proceeds to block 109 through 116 as previously described. If the answer is no, operation proceeds to block 106 where a question is asked as to whether the URL has an identified parent in the history list. If the answer is yes, the question is asked in block 108 as to whether the URL parent is visible and if the answer is yes, operation proceeds to block 109–116 as previously described. If the answer is no or if the URL does not have a parent in the history list, operation ends in block 107.

Turning to FIG. 1C, the routine which stores permanent duration level list permanence items for recall at next logon is shown beginning with the logoff signal being received in block 117. In block 118 the next item is retrieved from the working list and in 119 is checked to determine if the listing permanence level of this item is set to permanent. If the answer in block 119 is yes, the item's URL is stored in memory in block 120 and the item's activity permanence level as well as the item's other parameters such as title, color, etc. are all stored in memory as shown in blocks 121 and 122. In block 123, the question is asked as to whether another item is still in the working list and proceeds to loop back to block 118 to retrieve each item from the working list in turn, check it for listing permanence level parameter, etc. The process finally ends in block 124 when there are no more items in the working list.

In block 125, the process loop which is invoked as a user requests an individual history list for a item from the working list is shown. Beginning in block 125, the user's request starts the process which begins by creating an individual history list that is initially empty as shown in block 126. In block 127, the working item's URL is the first entry to the history list and in block 128 the question is asked as to whether the URL at the end of the individual history list has a parent URL in the common history list. If the answer is yes, the parent URL is appended from the common history list to the end of the individual history list and the question in block 128 is asked again until all parent chains for the URL have been exhausted. The process then flows to block 130 for displaying the individual history list to the user and waiting for the user's input or selection. Block 131 determines if the user has selected an item from the individual history list and if the answer is yes, it branches to the get command in block 132 which returns to FIG. 1A as shown. If the user does not select an item from the list, the process ends in block 133.

In order to more fully appreciate the functioning and operation of the invention in the preferred embodiment as described, a detailed hypothetical example which involves a user invoking multiple, concurrently active URLs in a typical business environment that would be encountered with a user using a network computer, will be given.

EXAMPLE

1. The user logs on. Refer to the "Logon" flowchart, FIG. 1A.

The browser loads the working list items that were saved at the end of the last session. These are the working list items that had a listing permanence level of Permanent. In this example, there were three working list items that were saved at the end of the last session. These three items appear initially in the working list when the user logs on as shown by the following table:

| Title | Visible | Indicator | URL | List Perm | Act Perm |
|---|---|---|---|---|---|
| 3270 | Yes | Loading | http://www.bigco.com/3270.htm | Permanent | Permanent |
| Invest | | | http://www.bigco.com/fc.ss | Permanent | Session |
| Weather | | | http://www.weather.com | Permanent | Transient |

The browser requests the content from the web for the "3270" URL as it loads the item from storage, because its activity duration permanence level is Permanent Some time elapses before the network responds to the browser. During this time, the "loading" indicator remains active on the "3270" item in the working list. The "3270" item is visible, though its content is blank Note that the user had set "3270" activity duration permanence level to Permanent because the user always uses this program, and wanted to load it automatically at every logon.

2. The "3270" URL and content arrive from the web.

Refer to the flowchart FIG. 1B, 100 "URL and content arrive because of prior request." The browser assigns the incoming content to the "3270" item in the working list by matching its URL with the incoming content's URL. The browser turns off the "Loading" indicator and turns on the "Active" indicator. The "3270" item is already visible, so the user immediately sees the 3270 application displayed.

The user begins using the 3270 content (an application) to manage, for example, schedules and mail.

At the end of step 2, the working list looks like this:

| Title | Visible | Indicator | URL | List Perm | Act Perm |
|---|---|---|---|---|---|
| 3270 | Yes | Active | http://www.bigco.com/3270.htm | Permanent | Permanent |
| Invest | | | http://www.bigco.com/fc.ss | Permanent | Session |
| Weather | | | http://www.weather.com | Permanent | Transient |

3. While creating mail in the 3270 application, the user needs to reference some financial data and selects the "Invest" item in the working list. Refer to the flowchart FIG. 1A, 90 "User selects existing item from working list".

The "Invest" content has not previously been requested during this session (since logon) from the web. Its Active Permanence is "Session", meaning that it will be kept active—but only after the user loads it the first time. So when the user selects "Invest" from the working list, the browser requests its content from the web. The "Loading" indicator for the "Invest" item in the working list is now active.

Note that the user had set the "Invest" active permanence to Session because the user only uses Invest occasionally. But once the user begins using it, it should stay loaded because the user is likely to use it repeatedly.

Since the user selected the "Invest" item from the working list, the browser will immediately show the content for this item, even though the screen will be blank until the content arrives from the web. Refer to the flowchart FIG. 1A, 93 "Show Item in working list."

After making the content for "Invest" visible, the browser must decide what to do with the previously visible item in the working list, in this case, the "3270" item Since the 3270 item does not have an active permanence of Transient, the browser leaves it loaded.

At the end of step 3, the working list looks like this:

| Title | Visible | Indicator | URL | List Perm | Act Perm |
|---|---|---|---|---|---|
| 3270 | | Active | http://www.bigco.com/3270.htm | Permanent | Permanent |
| Invest | Yes | Loading | http://www.bigco.com/fc.ss | Permanent | Session |
| Weather | | | http://www.weather.com | Permanent | Transient |

4. The "Invest" content arrives from the web. Refer to the flowchart FIG. 1B, 100 "URL and content arrive because of prior request."

The "Invest" URL is a spreadsheet in this assumed example, so the browser uses a spreadsheet viewer to display the content to the user. The browser turns off the "Loading" indicator and turns on the "Active" indicator for this item. At the end of step 4, the working list looks like this:

| Title | Visible | Indicator | URL | List Perm | Act Perm |
|---|---|---|---|---|---|
| 3270 | | Active | http://www.bigco.com/3270.htm | Permanent | Permanent |
| Invest | Yes | Active | http://www.bigco.com/fc.ss | Permanent | Session |
| Weather | | | http://www.weather.com | Permanent | Transient |

5. Inside the "Invest" content (a spreadsheet), the user selects a link which points to the URL "http://www.bigco.com/stock/today.html". Refer to the flowchart FIG. 1A, 80 "user selects URL link in Content Window."

The browser makes a new entry in the History list to record that the URL "http://www.bigco.com/stock/today.html" has the parent URL "http://www.bigco.com/fc.ss". When the child URL comes in from the web, the browser will need to know about its parent URL. (The previous URLs that came in from the web were also placed in the history list, but did not have parent URLs.)

The browser creates a new item for the working list using the URL that the user selected. The new item has list and active permanence levels of Transient. The browser inserts the new item into the working list following its parent, the currently visible item. The working list now looks like this:

| Title | Visible | Indicator | URL | List Perm | Act Perm |
|---|---|---|---|---|---|
| 3270 | | Active | http://www.bigco.com/3270.htm | Permanent | Permanent |
| Invest | Yes | Active | http://www.bigco.com/fc.ss | Permanent | Session |
| Quote | | Loading | http://www . . . today.html | Transient | Transient |
| Weather | | | http://www.weather.com | Permanent | Transient |

Note that the visible item is still "Invest". The new item, "Quote", was inserted in the working list but it was not made visible. Working list items are not made visible until their content arrives from the web, unless the user selects them in the list.

The title for the new item, "Quote," was established by querying the content identified by the URL. For example, http://www.bigco.com/stock/today.html is an HTML page with a tag that specifies "Quote" as the content's title. In reality, the title of the new item is its URL until its content begins to arrive from the web, because the title is contained in the content. When the content begins to arrive, the title is changed from the URL to the content's title.

The user can override this title with a user-specified title. The process of determining the title is standard in existing web browsers, and is not the focus of this invention.

6. The URL for the "Quote" item arrives from the web. Refer to the flowchart FIG. 1B, 100 "URL and content arrive because of prior request."

The browser assigns the content to the "Quote" item, turning off the "Loading" indicator and turning on the "Active" indicator. The "Quote" URL is an HTML page, so it is displayed with the HMTL viewer.

Then the browser consults the history list and finds that the "Quote" URL has a parent URL (the URL of the "Invest" item), and that the parent URL is in the Working list and is visible. In response to this condition, the browser makes the "Quote" item visible. The user gets the impression of (a) clicking on the "Quote" link in "Invest", (b) waiting for information retrieval, and (c) seeing the "Quote" HTML page.

The "Quote" URL is made visible via the process in the flowchart FIG. 1A, 93 "Show Item in working list." The previously visible item, "Invest", has an active permanence that is not Transient, so it is kept active in the Working list.

At then end of step 6, the working list looks like this:

| Title | Visible | Indicator | URL | List Perm | Act Perm |
|---|---|---|---|---|---|
| 3270 | | Active | http://www.bigco.com/3270.htm | Permanent | Permanent |
| Invest | | Active | http://www.bigco.com/fc.ss | Permanent | Session |
| Quote | Yes | Active | http://www . . . today.html | Transient | Transient |
| Weather | | | http://www.weather.com | Permanent | Transient |

7. Inside the "Quote" content, the user selects an URL which points to "http://www.bigco.com/stock/medco.htm". (The URL content will have an assumed title of "MedCo".)

As in step 5, an entry is added to the history list to show that the new URL is the child of "Quote". A new working list item is inserted after "Quote", so that the working list now looks like this:

| Title | Visible | Indicator | URL | List Perm | Act Perm |
|---|---|---|---|---|---|
| 3270 | | Active | http://www.bigco.com/3270.htm | Permanent | Permanent |
| Invest | | Active | http://www.bigco.com/fc.ss | Permanent | Session |
| Quote | Yes | Active | http://www . . . today.html | Transient | Transient |
| MedCo | | Loading | http://www . . . medco.html | Transient | Transient |
| Weather | | | http://www.weather.com | Permanent | Transient |

"Quote" is still visible. The content for "MedCo" is requested from the web.
8. The content for "MedCo" arrives from the web. As in step 6, refer to flowchart "URL and content arrive because of prior request."
As in step 6, the working list item "MedCo" is made visible because its parent URL, in the "Quotes" item, was visible when the new URL arrived. Refer to the "Show Item in Working List" flowchart. In this case, the previously visible working list item, "Quotes", has an activity duration permanence level of Transient. Therefore its content is discarded and its "Active" indicator is turned off. Furthermore, the history permanence level of "Quotes" is Transient Therefore, the working list item is removed from the working list. The impression the user receives is that the "MedCo" item replaces the "Quotes" item. This is the behavior of a standard web browser.
The working list now looks like this:

| Title | Visible | Indicator | URL | List Perm | Act Perm |
|---|---|---|---|---|---|
| 3270 | | Active | http://www.bigco.com/3270.htm | Permanent | Permanent |
| Invest | | Active | http://www.bigco.com/fc.ss | Permanent | Session |
| MedCo | Yes | Active | http://www . . . medco.html | Transient | Transient |
| Weather | | | http://www.weather.com | Permanent | Transient |

9. The user requests an individual history list for the currently visible Working list item, "MedCo." Refer to the flowchart FIG. 1C, 125 "User requests history list for individual working list item."
The common history list contains all of the URLs that have been requested so far. It currently looks like this:

| Title | URL | Parent URL |
|---|---|---|
| 3,270 | http://www.bigco.com/3270.htm | None |
| Invest | http://www.bigco.com/fc.ss | None |
| Quote | http://www . . . stock/today.html | http://www.bigco.com/fc.ss |
| MedCo | http://www . . . stock/medco.html | http://www . . . stock/today.html |

This is similar to a history list that would be kept by a standard web browser, with the additional feature of having a record of the parent URL. The prior browsers do not record each URL's parent URL. As in standard browsers, the user can view and traverse this "common" history list. It is a "common" history list in the sense that it is shared by all items in the working list.
If the user had been using the browser for a long time, the common history list would be much longer. Moreover, each URL's parent URL would not typically precede it in the list.

Rather than viewing the common history list, the user has requested to view an individual history list that is constructed specifically for the currently visible working list item, "MedCo." According to the flowchart FIG. 1C, 125, the browser first creates an individual history list 126 that is empty and initializes it, 127, with "MedCo." Then the browser finds in the common history list 128, (shown above) that MedCo's parent is the "Quote" URL, so "Quote" and its URL are added to, 129, the individual history list. The browser next finds that the URL of "Quote" has a parent which is the URL of "Invest", so "Invest" and its URL are added. Finally, the browser finds that "Invest" has no parent, 128, so it is finished constructing the individual history list and displays the result, 130. If the user had selected the initial URL from the individual history list, 131, the process returns to FIG. 1A, 132, at "GET" and proceeds as already described; otherwise, the history list process ends, 133.

The individual history list for "MedCo" looks like this to the user:

MedCo

Quote

Invest

Typically, an individual history list would be much shorter than the common history list. In this case, the common history list would only have been one item longer, but that is only because the user hasn't been using the browser for very long.
The benefit of the individual history list is that it only shows the items that were used to reach the current item. The process filters out the items in the common history list that are not relevant to the currently visible item in the Working list. This allows the user to retrace the links that were used to reach the currently visible item, instead of all links that have ever been used.

10. The user dismisses the history list without selecting an item in it. The browser displays the "MedCo" Working list item again, as if nothing had happened
11. The user reads the stock quote for MedCo, and then selects "Invest" from the working list to continue working on the spreadsheet. Refer to the flowchart "User selects existing item from working list".

Since the content is already loaded for the "Invest" item, the browser does not request it again. The "Invest" URL content is made visible. Refer to the "Show item in working list" flowchart FIG. 1A, 93. Since the previously visible item, "MedCo", has a listing permanence level and activity duration permanence level of Transient, its content is discarded and it is removed from the list.

This working list now looks like this:

| Title | Visible | Indicator | URL | List Perm | Act Perm |
| --- | --- | --- | --- | --- | --- |
| 3270 | | Active | http://www.bigco.com/3270.htm | Permanent | Permanent |
| Invest | Yes | Active | http://www.bigco.com/fc.ss | Permanent | Session |
| Weather | | | http://www.weather.com | Permanent | Transient |

The "Invest" item is now visible. The spreadsheet is still loaded, and the user's data is just as it was before the "Quote" item became visible.

12. The user selects the "Weather" item from the working list. Refer to the "User selects existing item from Working list" flowchart, FIG. 1A, 90.

The browser requests the URL "http://www.weather.com" and turns on the Loading indicator for the "Weather" item. The "Weather" item becomes visible, though it is blank, and the previously visible item, "Invest", is left active.

After step 12, the working list looks like this:

| Title | Visible | Indicator | URL | List Perm | Act Perm |
| --- | --- | --- | --- | --- | --- |
| 3270 | | Active | http://www.bigco.com/3270.htm | Permanent | Permanent |
| Invest | | Active | http://www.bigco.com/fc.ss | Permanent | Session |
| Weather | Yes | Loading | http://www.weather.com | Permanent | Transient |

13. The "Weather" item's URL and content are received from the web. Refer to the "URL and content arrive because of prior request" flowchart, FIG. 1B, 100.

The browser assigns the content to the "Weather" item in the Working list, turns off the "Loading" indicator, and turns on the "Active" indicator.

After step 13, the working list looks like this:

| Title | Visible | Indicator | URL | List Perm | Act Perm |
| --- | --- | --- | --- | --- | --- |
| 3270 | | Active | http://www.bigco.com/3270.htm | Permanent | Permanent |
| Invest | | Active | http://www.bigco.com/fc.ss | Permanent | Session |
| Weather | Yes | Active | http://www.weather.com | Permanent | Transient |

14. The user selects a link in the "Weather" item's content which points to the URL "http://www.weather.com/rtp.html". (This URL's content will have the title "RTP".) Refer to the flowchart "User selects URL in content window", FIG. 1A, 80.

The browser creates a new working list item with list and active permanence levels set to Transient. The browser inserts the new item after "Weather" with its Loading indicator turned on, and requests the new URL from the web.

After step 14, the working list looks like this:

| Title | Visible | Indicator | URL | List Perm | Act Perm |
|---|---|---|---|---|---|
| 3270 | | Active | http://www.bigco.com/3270.htm | Permanent | Permanent |
| Invest | | Active | http://www.bigco.com/fc.ss | Permanent | Session |
| Weather | Yes | Active | http://www.weather.com | Permanent | Transient |
| RTP | | Loading | http://www.weather.com/rtp.html | Transient | Transient |

15. Before the URL and content for "RTP" arrive from the web, the user selects a link in the "Weather" item's content that points to the URL "http://www.nyc.com/nyc". (The title will be "NYC.")

As before, the browser creates a new working list item with list and active permanence levels set to Transient. The browser inserts the new item after "Weather" with its Loading indicator turned on, and requests the new URL from the web.

After step 15, the working list looks like this:

| Title | Visible | Indicator | URL | List Perm | Act Perm |
|---|---|---|---|---|---|
| 3270 | | Active | http://www.bigco.com/3270.htm | Permanent | Permanent |
| Invest | | Active | http://www.bigco.com/fc.ss | Permanent | Session |
| Weather | Yes | Active | http://www.weather.com | Permanent | Transient |
| NYC | | Loading | http://www.weather.com/nyc.html | Transient | Transient |
| RTP | | Loading | http://www.weather.com/rtp.html | Transient | Transient |

16. The URL and content for "RTP" arrive from the web. Refer to the flowchart "URL and content arrive because of prior request," FIG. 1-B, 100.

The browser assigns the content to the "RTP" item, and turns off the Loading indicator and turns on the "Active" indicator for the "RTP" item. The browser then makes the "RTP" item visible according to the flowchart "Show item in Working list" FIG. 1-B, 109. The "RTP" item becomes visible because in the history list, its URL has a parent (the URL for "Weather") and that parent was visible.

The previously visible item, "Weather", has an activity duration permanence level of Transient. Therefore, since it is no longer visible, its content is discarded and its "Active" indicator is turned off. The "Weather" item has a listing duration permanence level that is not Transient, so it is not removed from the list.

Note that this behavior is desirable to the user. If the user selects the "Weather" item from the Working list again, even in the same session, the URL must be requested from the web again.

The user had no need to keep the data active, and there may even be benefit in loading a fresh copy of the data since it may have changed since last time it was loaded.

The working list now looks like this:

17. The URL and content for "NYC" arrive from the web. Refer to the flowchart "URL and content arrive because of prior request," FIG. 1B-100.

As before, the content is assigned to the appropriate working list item, "NYC", and its Loading indicator is turned off and its Active indicator is turned on. As before, the browser finds that the "NYC" item has a parent in the history list whose URL is the "Weather" item. However, the "Weather" item is no longer visible. In accordance with the flowchart, the new item, "NYC", does not become visible. It remains in the list with listing duration permanence level and activity duration permanence level set to Transient, until the user views it and then views another item.

The working list now looks like this:

| Title | Visible | Indicator | URL | List Perm | Act Perm |
|---|---|---|---|---|---|
| 3270 | | Active | http://www.bigco.com/3270.htm | Permanent | Permanent |
| Invest | | Active | http://www.bigco.com/fc.ss | Permanent | Session |
| Weather | | | http://www.weather.com | Permanent | Transient |
| NYC | | Loading | http://www.weather.com/nyc.html | Transient | Transient |
| RTP | Yes | Active | http://www.weather.com/rtp.html | Transient | Transient |

| Title | Visible | Indicator | URL | List Perm | Act Perm |
|---|---|---|---|---|---|
| 3270 |  | Active | http://www.bigco.com/3270.htm | Permanent | Permanent |
| Invest |  | Active | http://www.bigco.com/fc.ss | Permanent | Session |
| Weather |  |  | http://www.weather.com | Permanent | Transient |
| NYC |  | Active | http://www.weather.com/nyc.html | Transient | Transient |
| RTP | Yes | Active | http://www.weather.com/rtp.html | Transient | Transient |

18. The user logs off. Refer to the flowchart "Logoff", FIG. 1C, 117.

The first three items in the working list have a listing duration permanence level of Permanent, so their data is saved in storage. These three items will be recreated from the stored data the next time the user logs on. The remaining items do not have a listing duration permanence level of Permanent, so they are not saved.

Having thus described our invention with reference to a preferred embodiment thereof as illustrated in the drawings and described in detail, it will be apparent to those of skill in the art that various modifications and departures from this basic concept can be made without departing from the essential character of the invention. For example, as has been mentioned earlier, multiple levels of duration permanence for both URL activity and URL identity listing beyond the several described can easily be implemented and various permutations on whether URL items are listed or available for listing in individual history lists or not by allowing additional user selection choices such as in FIG. 6, could also be made. Numerous enhancements to the list keeping functions including adding of further indicators for newly arriving, but previously requested URL contents, etc. can easily be envisioned. So long as the essential concept of maintaining a URL item's activity duration permanence level indicator in the working list is maintained, the scope of variation in adding further enhancements and detail to the indicators maintained and for their functions will not depart from the spirit and nature of this invention.

Wherefore, what is desired to be protected by letters patent and is set forth in the claims as follows is intended by way of description and not by way of limitation.

What is claimed is:

1. A method of operating a network browser in a computer having associated means for accessing a communications network, comprising steps by said browser of:

requesting from said network the receipt at said browser of data contents for a specified Universal Resource Locator (URL) identifier;

receiving at said browser said requested data contents;

maintaining a working list of URLs; and for each said URL in said working list, assigning a level of activity duration permanence; and maintaining actively loaded into said computer only any said URL's content that has been once loaded and which has a said activity duration permanence level that is higher than transient.

2. The method as described in claim 1, further comprising steps upon receipt of a requested URL content, of:

displaying said received URL content and ceasing display of any previously visible displayed URL content and, if said previously displayed URL content had an activity duration permanence level and a listing duration permanence level of transient, removing said previously displayed URL content from said working list.

3. A method as described in claim 1, further comprising steps of:

checking said received URL content against the contents of said working list and, if a matching said URL is found in said list, assigning said received URL contents to said working list with said matching URL identification.

4. A method as described in claim 2 further comprising steps of:

checking said received URL content against the contents of said working list, and, if a matching said URL is found in said list, assigning said received URL contents to said working list with said matching URL identification.

5. A method as claimed in claim 1, further comprising steps of:

creating a new working list entry item for each said URL whose content has been requested and whose URL identification was not selected previously from said working list to begin said requesting step.

6. A method as described in claim 2, further comprising steps of:

creating a new working list entry item for each said URL whose content has been requested and whose URL identification was not selected previously from said working list to begin said requesting step.

7. A method as described in claim 3, further comprising steps of:

creating a new working list entry item for each said URL whose content has been requested and whose URL identification was not selected previously from said working list to begin said requesting step.

8. A method as described in claim 4, further comprising steps of:

creating a new working list entry item for each said URL whose content has been requested and whose URL identification was not selected previously from said working list to begin said requesting step.

9. A method as described in any one of claims 1–8, further including a step by said browser of:

maintaining a history list of said requested URL contents and, for each said URL having a parent URL, including said URL's parent URL identifier in said history list.

10. A method as described in claim 9, further comprising steps of:

receiving a user request for construction of an individual list of the history of a working URL's parentage and, responsive to the receipt of such a request, searching said history list to determine if said URL for which parentage is requested has a parent URL in said history list and;

if such a parent is found, appending such parent URL identifier to said individual history list and repeating said steps until no further parentage is found in said history list.

11. A network browser for use in a computer system having at least a processor and a memory in communication with said processor, said browser comprising a machine-readable medium bearing processor instructions comprising steps executable by said processor for:

requesting from said network the receipt at said browser of data contents for a specified Universal Resource Locator (URL) identifier;

receiving at said browser said requested data contents;

maintaining a working list of URLs; and for each said URL in said working list, assigning a level of activity duration permanence; and maintaining actively loaded into said computer only any said URL content that has been once loaded and which has a said activity duration permanence level that is higher than transient.

12. A network browser as claimed in claim 11, further comprising instructions executable by said processor for:

displaying said received URL content and ceasing display of any previously visible displayed URL content and, if said previously displayed URL content had an activity duration permanence level and a listing duration permanence level of transient, removing said previously displayed URL content from said working list.

13. A network browser as claimed in claim 11, further comprising instructions executable by said processor for:

checking said received URL content against the contents of said working list, and, if a matching said URL is found in said list, assigning said received URL contents to said working list with said matching URL identification.

14. A network processor as described in claim 12, further comprising instructions executable by said processor for:

checking said received URL content against the contents of said working list, and, if a matching said URL is found in said list, assigning said received URL contents to said working list with said matching URL identification.

15. A network browser as claimed in claim 11, further comprising instructions executable by said processor for:

creating a new working list entry item for each said URL whose content has been requested and whose URL identification was not selected previously from said working list to begin said requesting step.

16. A network browser as claimed in claim 12, further comprising instructions executable by said processor for:

creating a new working list entry item for each said URL whose content has been requested and whose URL identification was not selected previously from said working list to begin said requesting step.

17. A network browser as described in claim 13, further comprising instructions executable by said processor for:

creating a new working list entry item for each said URL whose content has been requested and whose URL identification was not selected previously from said working list to begin said requesting step.

18. A network browser as claimed in claim 14, further comprising instructions executable by said processor for:

creating a new working list entry item for each said URL whose content has been requested and whose URL identification was not selected previously from said working list to begin said requesting step.

19. A network processor as claimed in any of claims 11–18 and further including steps executable by said processor for:

maintaining a history list of said requested URL contents and, for each said URL having a parent URL, including said URL's parent URL identifier in said history list.

20. A network browser as claimed in claim 19, further comprising instructions executable by said processor for:

receiving a user request for construction of an individual list of the history of a working URL's parentage and, responsive to the receipt of such a requests, searching said history list to determine if said URL for which parentage is requested has a parent URL in said history list and; if such a parent is found, appending such parent URL identifier to said individual history list and repeating said steps until no further parentage is found in said history list.

21. A network browser control system comprising a processor, and a display, and a memory in communication with said processor, and a machine-readable medium bearing processor instructions comprising instructions executable by said processor for:

setting and maintaining URL activity duration permanence level and URL listing duration permanence level indicators in accordance with a users choice and for preventing a choice in which said URL listing duration permanence level is chosen to be greater than said activity duration permanence level.

22. A network browser control system as claimed in claim 21, further comprising instructions executable by said processor for:

displaying said received URL content and ceasing display of any previously visible displayed URL content and, if said previously displayed URL content had an activity duration permanence level and a listing duration permanence level of transient, removing said previously displayed URL content from said working list.

23. A network browser control system as claimed in claim 21, further comprising instructions executable by said processor for:

checking said received URL content against the contents of said working list, and, if a matching said URL is found in said list, assigning said received URL contents to said working list with said matching URL identification.

24. A network browser control system as claimed in claim 22, further comprising instructions executable by said processor for:

checking said received URL content against the contents of said working list, and, if a matching said URL is found in said list, assigning said received URL contents to said working list with said matching URL identification.

25. A network browser control system as claimed in claim 21, further comprising instructions executable by said processor for:

creating a new working list entry item for each said URL whose content has been requested and whose URL identification was not selected previously from said working list to begin said requesting step.

26. A network browser control system as claimed in claim 22, further comprising instructions executable by said processor for:

creating a new working list entry item for each said URL whose content has been requested and whose URL identification was not selected previously from said working list to begin said requesting step.

27. A network browser control system as claimed in claim 23, further comprising instructions executable by said processor for:

creating a new working list entry item for each said URL whose content has been requested and whose URL identification was not selected previously from said working list to begin said requesting step.

28. A network browser control system as claimed in claim 24, further comprising instructions executable by said processor for:

creating a new working list entry item for each said URL whose content has been requested and whose URL identification was not selected previously from said working list to begin said requesting step.

29. A network browser control system as claimed in claim 21, further comprising instructions executable by said processor for:

maintaining a history list of said requested URL contents and, for each said URL having a parent URL, including said URL's parent URL identifier in said history list.

30. A network browser control system as claimed in any of claims 21–29, further comprising instructions executable on said processor for:

receiving a user request for construction of an individual list of the history of a working URL's parentage and, responsive to the receipt of such requests, searching said history list to determine if said URL for which parentage is requested has a parent URL in said history list and; if such a parent is found, appending such parent URL identifier to said individual history list and repeating said steps until no further parentage is found in said history list.

* * * * *